United States Patent
Shi

(10) Patent No.: US 8,831,613 B2
(45) Date of Patent: Sep. 9, 2014

(54) RADIO BASE STATION; RADIO NETWORK CONTROLLER AND METHODS THEREIN

(75) Inventor: Nianshan Shi, Järfälla (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/522,864

(22) PCT Filed: Jun. 25, 2012

(86) PCT No.: PCT/SE2012/050707
§ 371 (c)(1),
(2), (4) Date: Jul. 18, 2012

(87) PCT Pub. No.: WO2013/048305
PCT Pub. Date: Apr. 4, 2013

(65) Prior Publication Data
US 2013/0079013 A1 Mar. 28, 2013

Related U.S. Application Data

(60) Provisional application No. 61/539,033, filed on Sep. 26, 2011.

(51) Int. Cl.
*H04W 36/00* (2009.01)
*H04W 72/00* (2009.01)
*H04W 4/00* (2009.01)
*H04W 36/18* (2009.01)

(52) U.S. Cl.
CPC .......... *H04W 36/18* (2013.01); *H04W 36/0055* (2013.01)
USPC ............................ 455/436; 455/450; 370/331

(58) Field of Classification Search
USPC ................. 455/436, 437, 438, 439, 450, 451, 455/452.1; 370/331
See application file for complete search history.

(56) References Cited

U.S. PATENT DOCUMENTS

| 6,230,013 B1 * | 5/2001 | Wallentin et al. ............. 455/436 |
| 2002/0151306 A1 * | 10/2002 | Ohtani et al. ................. 455/436 |
| 2004/0081128 A1 * | 4/2004 | Fiter et al. ..................... 370/338 |

(Continued)

FOREIGN PATENT DOCUMENTS

EP 1833268 A1 9/2007

OTHER PUBLICATIONS

3rd Generation Partnership Project. "3rd Generation Partnership Project; Technical Specification Group Radio Access Network; UTRAN Iub/Iur interface user plane protocol for DCH data streams (Release 10)." 3GPP TS 25.427, V10.1.0, Jun. 2011, Sophia Antipolis Valbonne, France.

(Continued)

*Primary Examiner* — Christopher M Brandt
(74) *Attorney, Agent, or Firm* — Coats & Bennett, PLLC

(57) ABSTRACT

Embodiments herein relate to a method in a radio base station (12,12') for handling Uplink Closed Loop Transmit Diversity, UL CLTD. The radio base station (12,12') is configured to control UL CLTD of a user equipment (10) served by the radio base station (12,12'). The radio base station receives from a radio network controller (15) an indication indicating removal of UL CLTD. The radio base station (12,12') then removes UL CLTD related operation for the user equipment (10) based on the received indication.

38 Claims, 7 Drawing Sheets

(56) References Cited

U.S. PATENT DOCUMENTS

| | | | |
|---|---|---|---|
| 2004/0235433 A1* | 11/2004 | Hugl et al. | 455/101 |
| 2005/0207374 A1* | 9/2005 | Petrovic et al. | 370/331 |
| 2006/0068831 A1* | 3/2006 | Stewart et al. | 455/522 |
| 2007/0171867 A1* | 7/2007 | Kim | 370/331 |
| 2007/0197222 A1* | 8/2007 | Rune | 455/436 |
| 2009/0111473 A1* | 4/2009 | Tao et al. | 455/440 |
| 2010/0029276 A1* | 2/2010 | Hwang | 455/436 |
| 2010/0056145 A1* | 3/2010 | Hashimoto et al. | 455/435.2 |
| 2010/0120444 A1* | 5/2010 | Kuningas et al. | 455/450 |
| 2010/0296489 A1* | 11/2010 | Zhang et al. | 370/335 |
| 2010/0323753 A1* | 12/2010 | Imamura et al. | 455/552.1 |
| 2011/0026631 A1* | 2/2011 | Zhang et al. | 375/267 |
| 2011/0092207 A1* | 4/2011 | Motohashi et al. | 455/435.1 |
| 2011/0194522 A1* | 8/2011 | Zhou | 370/329 |
| 2011/0212726 A1* | 9/2011 | Wen | 455/436 |
| 2012/0008510 A1* | 1/2012 | Cai et al. | 370/252 |
| 2012/0009968 A1* | 1/2012 | Kludt et al. | 455/522 |
| 2012/0057554 A1* | 3/2012 | Xu et al. | 370/329 |
| 2012/0207045 A1* | 8/2012 | Pelletier et al. | 370/252 |
| 2012/0275403 A1* | 11/2012 | Zhang et al. | 370/329 |
| 2012/0276915 A1* | 11/2012 | Kubota et al. | 455/452.1 |
| 2012/0287869 A1* | 11/2012 | Xi et al. | 370/329 |

OTHER PUBLICATIONS

3rd Generation Partnership Project. "3rd Generation Partnership Project; Technical Specification Group Radio Access Network; UTRAN Iur interface Radio Network Subsystem Application Part (RNSAP) signalling (Release 10)." 3GPP TS 25.423, V10.8.0, Sep. 2012, Sophia Antipolis Valbonne, France. (reference broken up into 2 parts).

3rd Generation Partnership Project. "3rd Generation Partnership Project; Technical Specification Group Radio Access Network; UTRAN Iub interface Node B Application Part (NBAP) signalling (Release 10)." 3GPP TS 25.433, V10.7.0, Sep. 2012, Sophia Antipolis Valbonne, France. (reference broken up into 2 parts).

3GPP, Technical Specification Group Radio Access Network; UTRAN Iub interface Node B Application Part (NBAP) signalling (Release 11), 3GPP TS 25.433 V11.0.0, Dec. 2011, pp. 1-1285, Sophia Antipolis, Valbonne, FR.

3GPP, Technical Specification Group Radio Access Network; UTRAN Iub/Iur interface user plane protocol for DCH data streams (Release 11, 3GPP TS 25.427 V11.0.0, Dec. 2011, pp. 1-48, Sophia Antipolis, Valbonne, FR.

3GPP, Technical Specification Group Radio Access Network; UTRAN Iur interface Radio Network Subsystem Application Part (RNSAP) signalling (Release 11), 3GPP TS 25.423 V11.0.0, Dec. 2011, pp. 1-1145, Sophia Antipolis, Valbonne, FR.

Ericsson, "Indicator to the old UL CLTD Control Node B", 3GPP TSG-RAN3 Meeting #73bis, pp. 1-4, Oct. 10-14, 2011, Zhuhai, China, R3-112591.

Ericsson, "Introduction of uplink Closed Loop Transmit Diversity", 3GPP TSG RAN WG3 Meeting #73bis, pp. 1-6, Oct. 10-14, 2011, Zhuhai, China, R3-112590.

Huawei, et al., "L2&L3 impacts by UL CLTD", 3GPP TSG RAN WG2 Meeting #74, pp. 1-4, May 9-13, 2011, Barcelona, Spain, R2-112975.

\* cited by examiner

RADIO BASE STATION; RADIO NETWORK CONTROLLER AND METHODS THEREIN

TECHNICAL FIELD

Embodiments herein relate to methods and radio base stations in a radio communications networks. In particular, embodiments herein relate to manage and handle Uplink Closed Loop Transmit Diversity.

BACKGROUND

In a typical cellular radio system, wireless terminals, also known as mobile stations and/or user equipments (UEs), communicate via a Radio Access Network (RAN) to one or more core networks. The radio access network covers a geographical area which is divided into cell areas, with each cell area being served by a base station, e.g., a Radio Base Station (RBS), which in some networks may also be called, for example, a "NodeB" in a Universal Mobile Telecommunications System (UMTS) or "eNodeB" (eNB) in a Long Term Evolution (LTE) network. A cell is a geographical area where radio coverage is provided by the radio base station equipment at a base station site. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipments within range of the base stations.

In some versions of the RAN, several base stations are typically connected, e.g., by landlines or microwave, to a controller node, such as a Radio Network Controller (RNC) or a Base Station Controller (BSC), which supervises and coordinates various activities of the plural base stations connected thereto. The RNCs are typically connected to one or more core networks.

A UMTS is a third generation mobile communication system, which evolved from the second generation (2G) Global System for Mobile Communications (GSM). The UMTS terrestrial radio access network (UTRAN) is essentially a RAN using Wideband Code Division Multiple Access (WCDMA) for user equipments. In a forum known as the Third Generation Partnership Project (3GPP), telecommunications suppliers propose and agree upon standards for third generation networks and UTRAN specifically, and investigate enhanced data rate and radio capacity.

3GPP Technical Specification Group (TSG) RAN has agreed on a work item, referred to as "Uplink Transmit Diversity for High Speed Packet Access (HSPA)—Closed Loop" Feedback determination in Soft Hand Over (SHO) and comprises, according to the agreement, the following items or features:

Precoding weights, which are used to control transmission in e.g. strength and direction, are determined by a single cell.

RNC configures which cell that shall determine the precoding weights for each UE and sends signals to NodeB over NodeB Application Part (NBAP) and to UE over Radio Resource Control (RRC) protocols. NBAP is a signalling protocol responsible for the control of the NodeB, If an Enhanced-Dedicated Channel (E-DCH) serving cell is configured, this E-DCH serving cell is configured to determine the precoding weights. E-DCH is a transport uplink channel used in the 3G technologies, such as HSPA.

If no E-DCH serving cell is configured, if an High Speed—Downlink Shared Channel (HS-DSCH) serving cell is configured, this cell is configured to determine the precoding weights.

In the case that the UE is not configured with HSPA, there will be no serving cell and Uplink (UL) Closed Loop Transmit Diversity (CLTD) shall still apply. That is direction of transmission and transmission, due to precoding weights, from a plurality of transmit antennas is controlled by feedback from the NodeB. It is up to RNC to decide which cell or NodeB is configured to determine the precoding weights.

High Speed—Shared Control Channel (HS-SCCH) orders are to be used as a way to activate or to deactivate UL CLTD when High Speed Downlink Packet Access (HSDPA) is configured. In the case that the user equipment is not configured with HSDPA, the Serving (S)-RNC-based activation/deactivation of UL CLTD is applicable, i.e., NodeB informs the S-RNC of CLTD activation/deactivation and S-RNC informs the UE.

When there is an E-DCH serving cell, or a HS-DSCH serving cell, the serving cell is used to determine the precoding weights. When there is a handover involving a serving cell change, the new serving cell will perform the above tasks and the old serving cell is aware of the change. When there is a handover not involving a serving cell change, the original serving cell will continue control of UL CLTD, control herein means determine precoding weights e.g. to beamform, i.e. direct, the transmission.

When there are only Dedicated Physical Channel (DPCH) cells, i.e., the UE is not configured with HSPA, SRNC has to decide which cell should be configured to determine the precoding weights, to be the control cell. During soft handover, a new Radio Link is added to a new cell and the new cell may be used as the control cell of UL CLTD. But there is only signalling between S-RNC and the new NodeB serving the new cell, i.e. a target NodeB or cell, during this procedure. There is no signalling between SRNC and the old NodeB, i.e. the NodeB serving the previous serving cell i.e. a source NodeB. Hence the old control cell, i.e. the source cell, will keep the UL CLTD related resources and continue sending UL CLTD related data to the UE at L1/physical interface, even though the UE will be instructed to listen only to the new control cell for UL CLTD. This leads to an ineffective usage of radio resources and may lead to a reduced performance of the radio access network.

SUMMARY

An object of embodiments herein is to provide a mechanism that enhances performance in a radio communications network.

According to an aspect of embodiments herein the object is achieved by a method in a radio network controller for managing Uplink Closed Loop Transmit Diversity, UL CLTD. The radio network controller controls a first radio base station or a second radio base station. The first radio base station is configured to control UL CLTD of a user equipment served by the first radio base station. The radio network controller decides that the second radio base station is to control UL CLTD for the user equipment. The radio network controller transmits to the first radio base station, an indication indicating removal of UL CLTD control for the user equipment. According to another aspect of embodiments herein the object is achieved by a method in a radio base station, such as the first radio base station, for handling UL CLTD. The radio base station is configured to control UL CLTD of a user equipment served by the radio base station. The radio base station receives from a radio network controller, an indication indicating removal of UL CLTD. The radio base station then removes UL CLTD related operation for the user equipment based on the received indication.

According to yet another aspect of embodiments herein the object is achieved by a radio network controller for managing UL CLTD. The radio network controller controls a first radio base station or a second radio base station. The first radio base station is configured to control UL CLTD of a user equipment served by the first radio base station. The radio network controller comprises a control processor configured to decide that the second radio base station is to control UL CLTD for the user equipment. The radio network controller further comprises a signalling circuit configured to transmit to the first radio base station, an indication indicating removal of UL CLTD control for the user equipment.

According to still another aspect of embodiments herein the object is achieved by a radio base station for handling UL CLTD. The radio base station is configured to control UL CLTD of a user equipment served by the radio base station. The radio base station comprises a communication interface configured to receive from a radio network controller, an indication indicating removal of UL CLTD. The radio base station further comprises a control processor configured to remove UL CLTD related operation for the user equipment based on the received indication.

Embodiments herein introduce a UL CLTD "removal" indicator. The UL CLTD "removal" indicator allows an SRNC to inform the old or prior UL CLTD control cell that it is no longer the control cell. For example, some embodiments herein use spare bits in a current DCH DL Data frame as the removal indicator, while one or more alternative embodiments use alternative signalling to signal the UL CLTD removal indication. Thus, embodiments here reduce the radio resources used at a source cell and improve the performance of the radio communications network as these radio resources may be used for some other communications.

BRIEF DESCRIPTION OF THE DRAWINGS

Embodiments will now be described in more detail in relation to the enclosed drawings, in which.

DETAILED DESCRIPTION

Figure 1:
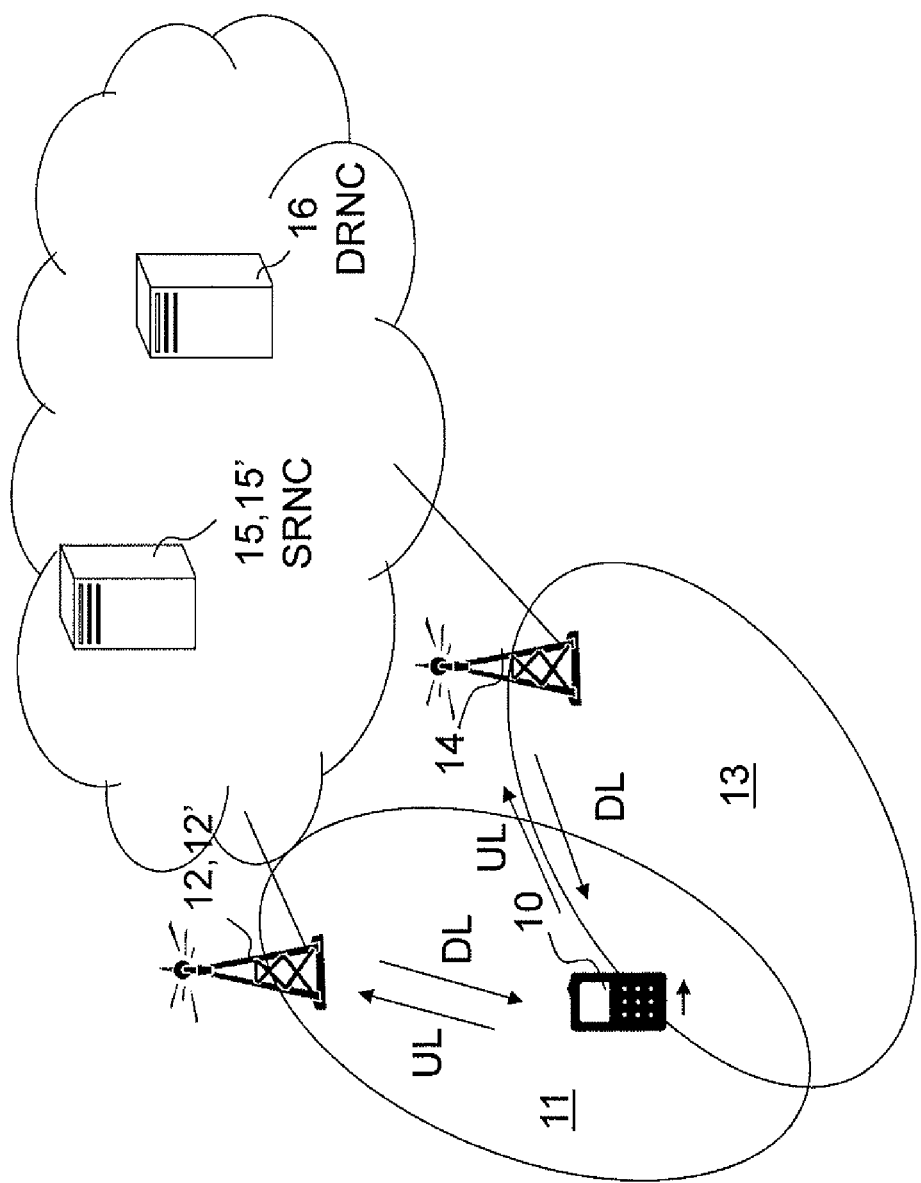
FIG. 1 is a schematic overview depicting a radio communications network according to embodiments herein.

FIG. 1 is a schematic overview depicting a radio communications network. The radio communications network may comprise an UMTS, a WCDMA, a Code Division Multiple Access 2000 (CDMA200) or a similar network.

In a typical radio communications network, wireless terminals, herein referred to as user equipments (UEs), communicate via a radio access network (RAN) to one or more core networks. FIG. 1 illustrates a user equipment 10 communicating with a radio access network within the radio communications network. It should be understood by the skilled in the art that "user equipment" is a non-limiting term which means any wireless terminal, device or node e.g. Personal Digital Assistant (PDA), laptop, mobile, sensor, relay, mobile tablets or even a small base station communicating within respective cell.

The RAN covers a geographical area which is divided into cell areas, with each cell area being served by a radio base station. For example, a first cell 11, also called old or source cell, is served by a radio base station 12, exemplified as a first radio base station 12', and a second cell 13, also called new or target cell, is served by a second radio base station 14. A cell is a geographical area where radio coverage is provided by the respective radio base station at a base station site. Each cell is identified by an identity within the local radio area, which is broadcast in the cell. Another identity identifying the cell uniquely in the whole radio communications network is also broadcasted in the cell. The respective radio base station 12',14 communicate over the air interface operating on radio frequencies with the user equipment 10 within range of the respective radio base station 12',14. In a soft handover scenario, the user equipment 10 performs UL transmissions from the user equipment 10 towards the respective radio base station 12',14. The respective radio base station 12',14 performs downlink (DL) transmissions from the respective radio base station 12',14 towards the user equipment 10. The respective radio base station 12',14 may also be referred to as e.g. a NodeB, an evolved Node B (eNB, eNode B), a base transceiver station, Access Point Base Station, base station router, or any other network unit capable to communicate with the user equipment 10 within the cells 11,13 served by the respective radio base station 12',14 depending e.g. of the radio access technology and terminology used.

In some versions of the RAN, several radio base stations are typically connected, e.g., by landlines or microwave, to a radio network controller 15, such as a Serving Radio Network Controller (SRNC) 15' or a base station controller (BSC), which supervises and coordinates various activities of the plural radio base stations connected thereto, e.g. the first radio base station 12' and the second radio base station 14. The SRNC 15' is typically connected to one or more core networks and may also be connected to a Drifting RNC (DRNC) 16. The SRNC 15' controls connection to the user equipment 10 and the DRNC 16 lends its resources for the SRNC 15' for the user equipment 10. Thus, the SRNC 15' has an RRC connection to the user equipment 10; the DRNC 16 connects to the SRNC 15' via a Iur interface.

The radio communications network may be any cellular radio network comprising an RNC, e.g. the RNC 15, capable of establishing and routing a data packet session through different network transmission paths exploiting different routing protocols. The radio communications network may e.g. be a UTRAN-General Packet Radio Service (GPRS) network, a WCDMA network, a CDMA 2000 network, an Interim Standard (IS)-95 network, a Digital-Advanced Mobile Phone Service (D-AMPS) network etc. The term RNC should here therefore not be interpreted to strictly so as to comprise only an RNC according to the 3GPP UTRAN standard, but any network control node capable of mapping a data session to different transmission paths through its different ports wherein the different transmission paths exploit different routing protocols. For instance, in case of a CDMA 2000 network, the RNC functionality described below according to embodiments herein may be realised in the Base Station Controllers (BSC) of the CDMA 2000 network.

The user equipment 10 comprises a plurality of transmit antennas and is controlled by the SRNC 15' performing UL CLTD control. When UL CLTD is configured and the user equipment 10 is only using DCH, during Radio Link Setup, the first radio base station 12' will be a control radio base station as regards to UL CLTD. When there is a soft handover, a new radio link is added, and the SRNC 15', serving the control radio base station 12', may decide that the new cell, e.g. the second cell 13, should be a new control cell for UL CLTD. If the SRNC 15' takes that decision, it configures the user equipment 10 and the 'new' second radio base station 14 associated with the new cell for control of UL CLTD.

There is usually no control plane, i.e., Iub or Iur, signalling between the SRNC 15' and the old (first) radio base station 12' during this procedure. The Iub is an interface, internal in the UTRAN, connecting the SRNC 15' with the first radio base station 12'. The Iur is an interface connecting two RNCs with each other. On the other hand, the user plane data frame between SRNC 15' and the old first radio base station 12' continues as usual.

In the User Plane, when SRNC 15' sends DL data, e.g. DCH DL data, to the first radio base station 12', it will, according to embodiments herein, indicate to the first radio base station 12' that it is no longer a UL CLTD control node, so the first radio base station 12' can cease or remove its UL CLTD related operation with respect to the user equipment 10. In an example embodiment of implementing an advantageous removal indication e.g. in a message, a User Plane (UP) DCH Frame Protocol technical Specification 25.427 is affected, see FIG. 3 below.

Figure 2:
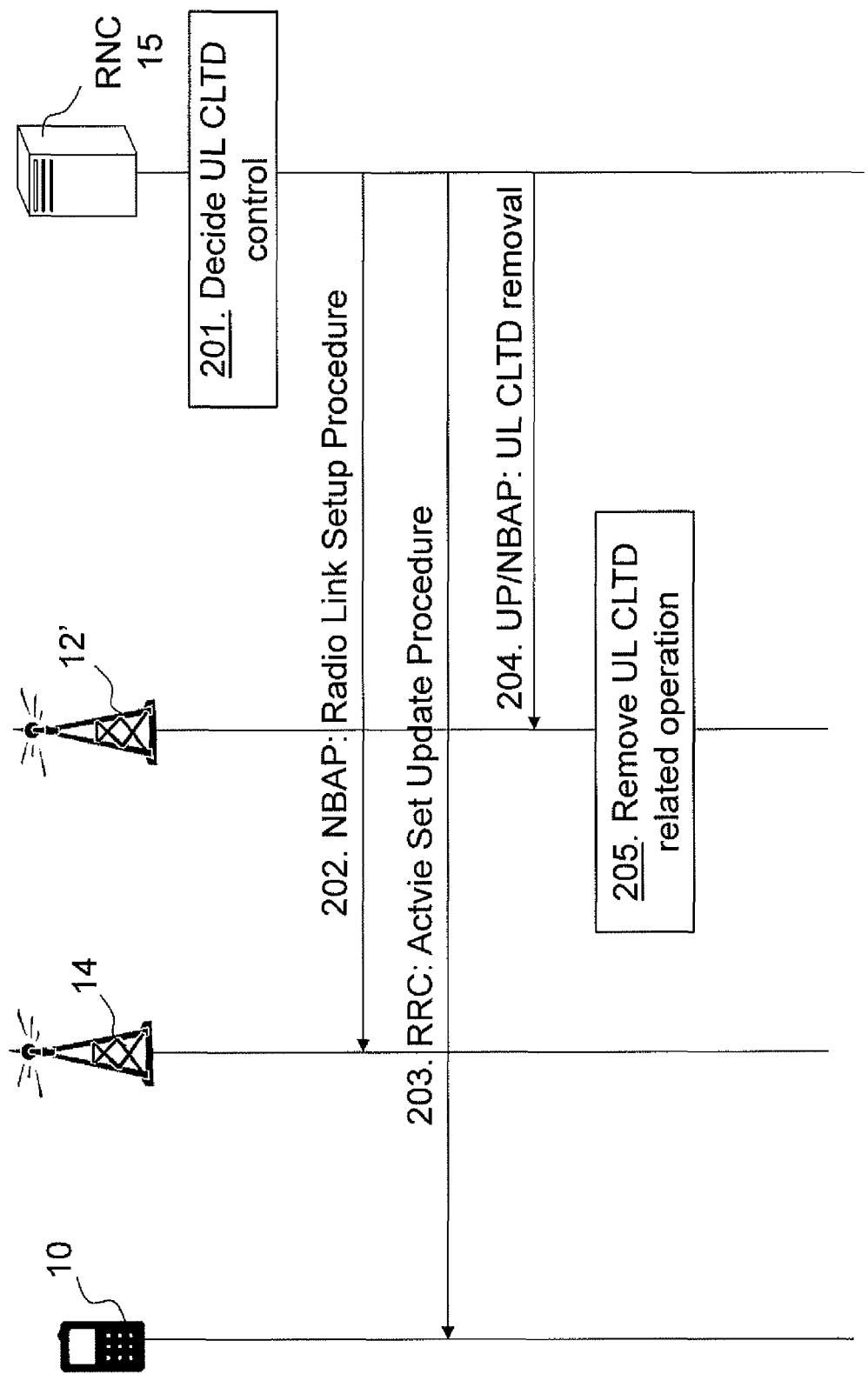
FIG. 2 is a combined flow chart and signalling scheme according to embodiments herein.

With reference to FIG. 2, the below actions and signalling scheme describe some embodiments herein. Note that for this example, there is a radio link between the user equipment 10 and the first radio base station 12', also referred to as "old" NodeB. The radio network controller 15, e.g. the serving radio network controller 15', controls the first radio base station 12'. The first radio base station 12' and the user equipment 10 are both configured for UL CLTD. That is, both support UL CLTD ad UL CLTD is configured to use. E.g. both the user equipment 10 and the first radio base station 12' indicate that they support UL CLTD. Then the radio network controller 15 may decide to use this feature. The radio network controller 15 configures the cell with certain parameters; then the radio network controller 15 tells the user equipment 10. The user equipment 10 detects a new cell, carrier/signal of a different cell ID, belonging to a new NodeB, e.g. the second radio base station 14 and a SHO may start. It should be noted that is the user equipment does support e.g. Release 99 DCH and not HSPA.

Action 201. The RNC 15 decides that the new cell in the second radio base station 14 should be the UL CLTD control cell, e.g. when the new cell is better in quality or strength than the old cell.

Action 202. In some embodiments, the RNC 15 sets up a new radio link with a UL CLTD configuration using e.g. NBAP protocol.

Action 203. The RNC 15 may send an "Active Set Update" message to the user equipment 10 to complete the SHO procedure in an "Active Set Update" procedure, e.g. using RRC protocols to the user equipment 10. The active set update message may e.g. comprise: Radio link addition to an active set; Radio link removal from the active set; Combined radio link addition and removal on the active set; Addition of a radio link to the E-DCH active set; Removal of a radio link from the E-DCH active set; Radio link addition to the secondary E-DCH active set; Radio link removal from the secondary E-DCH active set; Combined radio link addition and removal on the secondary E-DCH active set or similar.

Action 204. The RNC 15 sends an indication indicating removal of UL CLTD control for the user equipment 10. The RNC 15 may e.g. indicate in a DL DCH Data Frame, being a packet comprising bits of information, to the first radio base station 12' that it is not a UL CLTD control Node any more. For example, the RNC 15 advantageously includes a UL CLTD "Removal Indicator" in the data frame to the first radio base station 12'.

In some embodiments an alternative approach modifies the existing control plane signalling, for example Radio Link Reconfiguration Prepare, or adds a new control plane message for the RNC 15, to notify the first radio base station 12' that it is no longer a UL CLTD control node. The difference in this alternative is that instead of using the UP DL DCH Data Frame to provide a removal indicator, a Radio Network Subsystem Application Part (RNSAP), if the first radio base station 12' is in a Drifting Radio Network Subsystem (DRNS), and NBAP message is sent to inform the first radio base station 12'. Notably, a UP DL DCH Data Frame may be sent whenever there is a downlink data payload, but the control plane (CP) RNSAP/NBAP message as contemplated herein would be sent for the purpose of providing the UL CLTD removal notification to the first radio base station 12' and such operation therefore affects both the Iur, i.e. RNSAP, and Iub, i.e. NBAP, protocols.

Another alternative approach modifies the control frame in the user plane protocol. For example, some embodiments herein use a Radio Interface Parameter Update to provide the UL CLTD removal notification to the first radio base station 12'. The Radio Interface Parameter Update procedure is used to update radio interface parameters which are applicable to all Radio Links (RLs), or E-DCH Serving Radio Link Set, for the involved user equipment 10. Both synchronised and unsynchronised parameter updates are supported. Alternatively, a new control frame may be created for such purposes. Assuming use of the Radio Interface Parameter Update message, then a Radio Interface Parameter Update may be sent from the RNC 15 to the first radio base station 12' via the User Plane. Note that this control frame is otherwise not necessarily sent. That is, the message may be sent specifically to provide the removal indication to the first radio base station 12'. Consequently, use of this alternative implementation would affect the UP DCH Frame Protocol, see e.g. 25.427 chapter 6.3.3.9.

One non-limiting example advantage associated with the use of a spare bit (or bits) in the UP frame protocol is that such an implementation has little impact to the relevant standard (s). A further advantage is that use of the spare bit or bits in the manner taught herein saves precious L1/physical resources.

It should be noted that if the first and second radio base stations 12',14 are controlled by the DRNC 16, RNC 15 will send the control plane signalling via the Iur Interface towards the DRNC 16, and then the DRNC 16 will send the control plane signalling via the Iub Interface towards the first and second radio base stations 12',14.

Action 205. The first radio base station 12', being responsive to its receipt of the UL CLTD Removal Indicator, ends or otherwise removes all its UL CLTD related operation for the user equipment 10, e.g. the parameters to configure a downlink channel related to UL CLTD. That is, the first radio base station 12' ends sending control message regarding UL CLTD to the user equipment 10. Thus, embodiments herein enhance the usage of radio resources.

Figure 3:
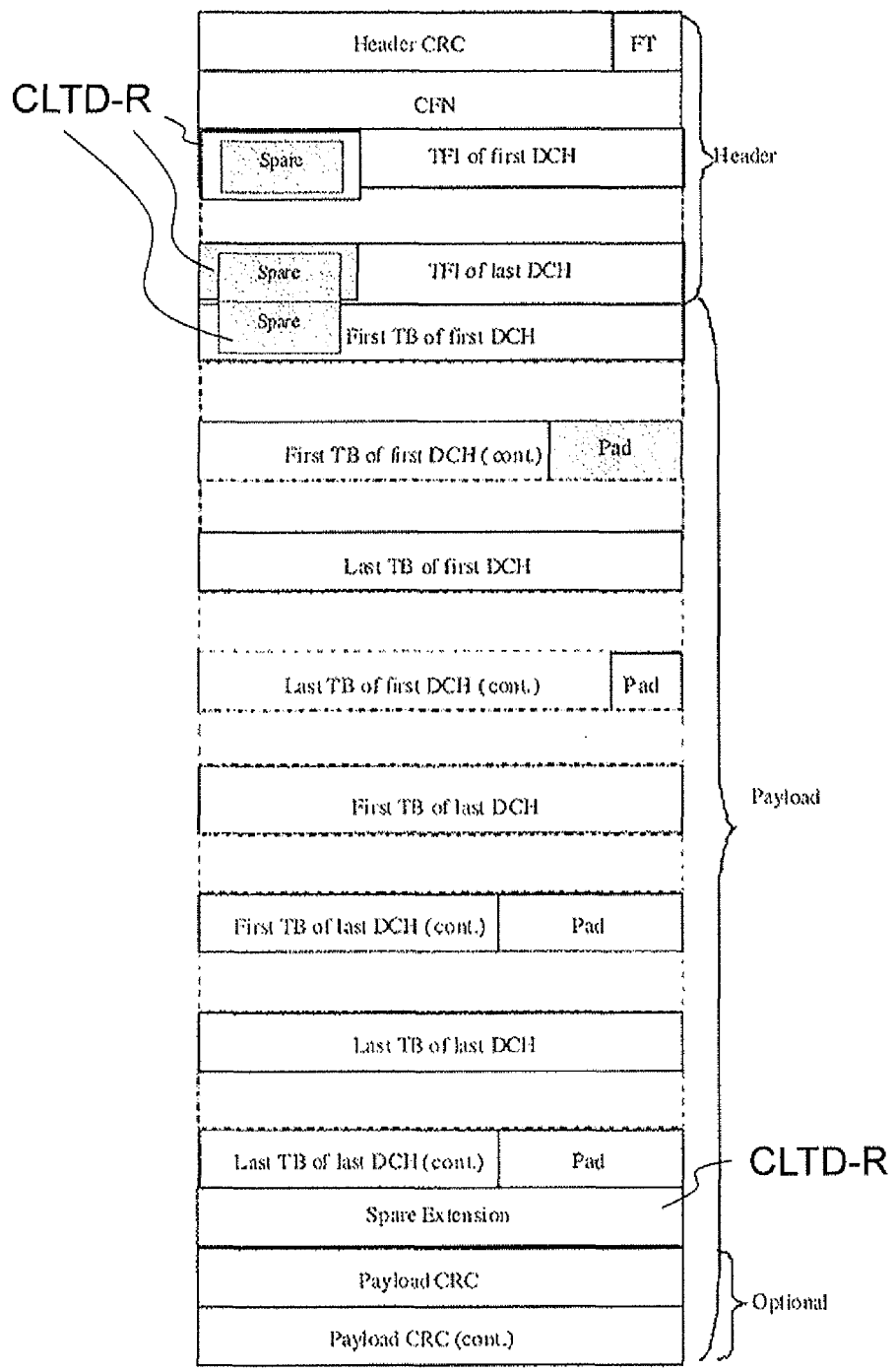
FIG. 3 is a schematic illustration of a user plane frame according to embodiments herein.

FIG. 3 illustrates a UP frame as defined in 25.427 Chapter 6.2.3 DL DATA FRAME according to some embodiments herein. The DL data Frame comprise: bits denoted Header Cyclic Redundancy Check (CRC) that are CRC applied to the remaining part of the header; Frame Type (FT) describes if it is a control frame or a data frame; Connection Frame Number (CFN), which is an indicator as to which radio frame the first data was received on uplink or shall be transmitted on downlink; Transport Format Indicator (TFI), which is a local number of a transport format used for a transmission time interval, and Transport Block is a block of data to be transmitted or received over the air interface. The DL DATA FRAME comprises bits indicating TFI of first DCH, TFI of last DCH; First TB of first DCH; Last TB of first DCH; First TB of last DCH; Last TB of last DCH. Some bits indicate Payload CRC, which is CRC for the payload, and Spare Extension, which indicates the location where new IEs may in the future be added in a backward compatible way. Furthermore, the DL DATA FRAME comprises PAD bits, and spare bits.

According to embodiments herein the DL DATA FRAME may comprise a bit denoted UL CLTD Removal (CLTD-R). The CLTD-R is an indicator of the removal of UL CLTD. Value range: {0=UL CLTD not relevant, 1=UL CLTD Removal} and may be Field length: 1 bit. The indicator may comprises more than one bit as well.

The spare bit to be used for providing the contemplated indication is, for example, one of the spare bits of octet #3 in the Header (TFI of first DCH). The CLTD-R may be a spare bit in the $5^{th}$ octet of bits, the $6^{th}$ octet of bits, or a bit in the spare extension, wherein an octet is a field of eight bits.

Figure 4:
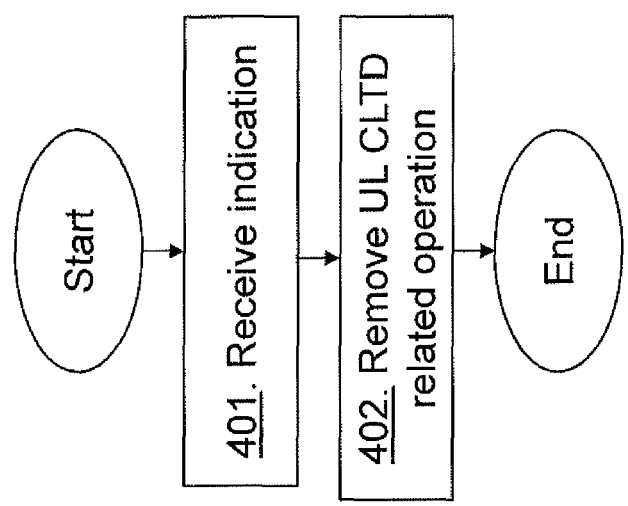
FIG. 4 is a schematic flowchart depicting a method in a radio base station according to embodiments herein.

The method actions in the radio base station 12, exemplified above as the first radio base station 12', for handling UL CLTD according to some general embodiments will now be described with reference to a flowchart depicted in FIG. 4. The radio base station 12 is configured to control UL CLTD of the user equipment 10 served by the radio base station 12.

Action 401. The radio base station 12 receives an indication indicating removal of UL CLTD from a radio network controller, such as the radio network controller 15. The radio base station may receive the indication over a Dedicated Channel. The indication may be comprised in only one bit. The indication may be comprised in a Downlink Data frame of a User Plane Dedicated Channel, UP DCH, frame protocol. In some embodiments the indication is comprised in a spare bit of an octet of bits in a User Plane frame protocol. The indication may be comprised in a Radio Network Subsystem Application Part, RNSAP, message or a NodeB Application Part, NBAP, message. The indication may indicate that the radio base station 12 is no longer an UL CLTD control node. The indication may be comprised in a Radio Interface Parameter Update message.

Action 402. The radio base station 12 removes UL CLTD related operation for the user equipment 10 based on the received indication. Thus, the previous control cell is stopped.

Figure 5:
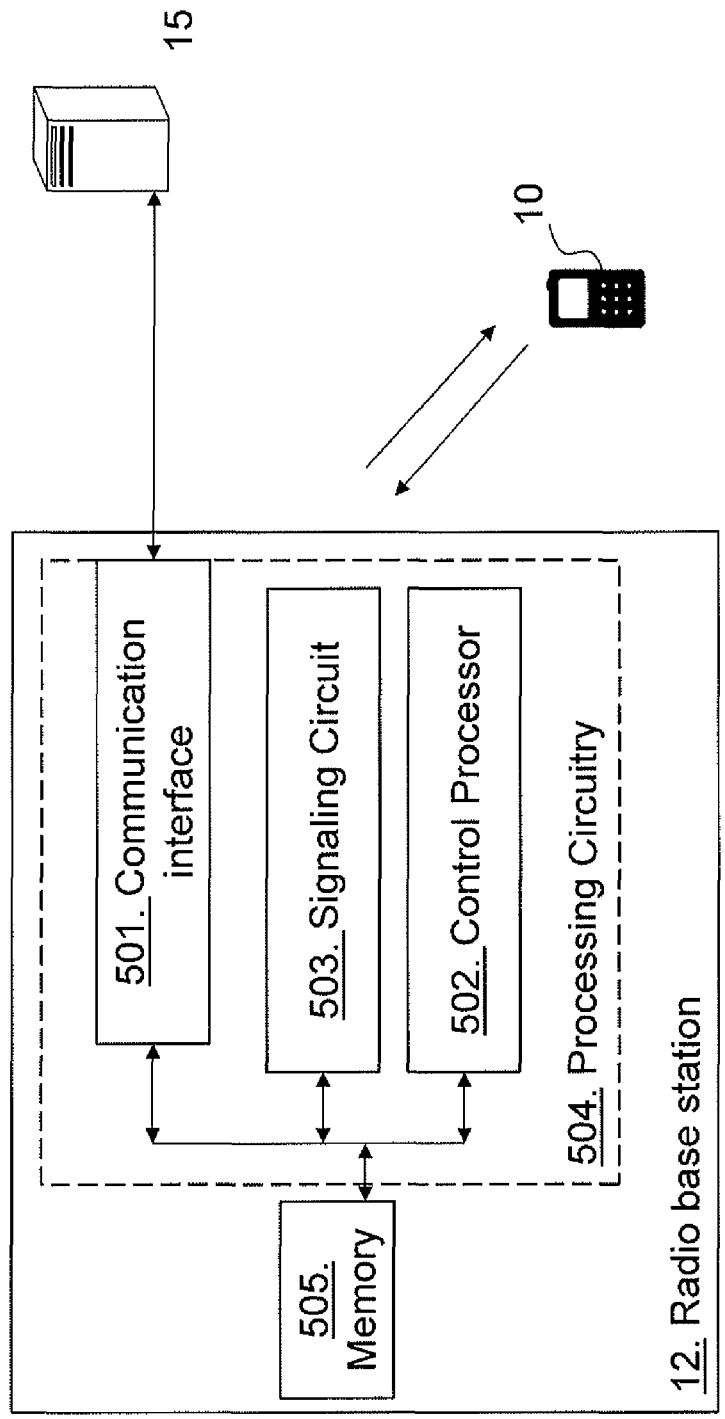
FIG. 5 is a block diagram depicting a radio base station according to embodiments herein.

FIG. 5 is a block diagram depicting the radio base station 12 according to embodiments herein for handling UL CLTD. The radio base station 12 is configured to control UL CLTD of the user equipment 10 served by the radio base station 12.

The radio base station 12 comprises a communication interface 501 configured to receive from the radio network controller 15, an indication indicating removal of UL CLTD. The communication interface 501 may be configured to receive the indication over a Dedicated Channel. The indication may comprise only one bit. The indication may be comprised in a Downlink Data frame of a User Plane Dedicated Channel, UP DCH, frame protocol. The indication may be comprised in a spare bit of an octet of bits in a User Plane frame protocol. The indication may be comprised in a Radio Network Subsystem Application Part, RNSAP, message or a NodeB Application Part, NBAP, message. The indication may indicate that the radio base station 12,12' is no longer an UL CLTD control node. The indication may be comprised in a Radio Interface Parameter Update message.

The radio base station 12 further comprises a control processor 502 configured to remove UL CLTD related operation for the user equipment 10 based on the received indication.

The indication may be received via a signalling circuit 503.

Figure 6:
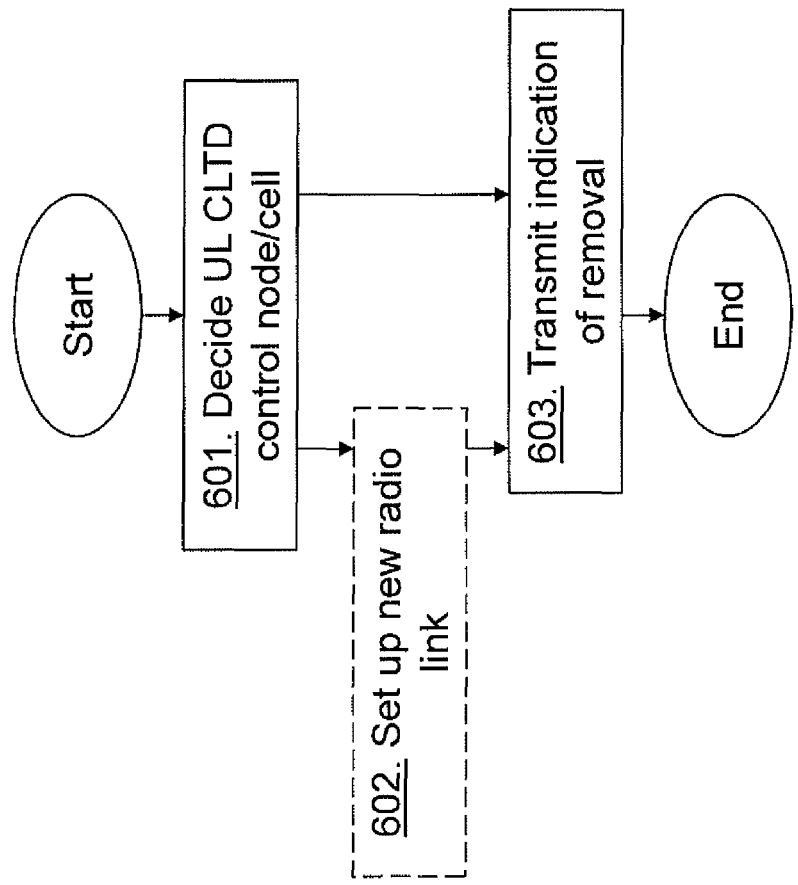
FIG. 6 is a schematic flowchart depicting a method in a radio network controller according to embodiments herein.

The method actions in the radio network controller 15, exemplified as the serving radio network controller 15' in the FIG. 1 above, for managing UL CLTD according to some general embodiments will now be described with reference to a flowchart depicted in FIG. 6. The actions do not have to be taken in the order stated below, but may be taken in any suitable order. Actions performed in some embodiments are marked with a dashed box. The radio network controller 15 controls the first radio base station 12' or the second radio base station 14. The first radio base station 12' is configured to control UL CLTD of the user equipment 10 served by the first radio base station 12'.

Action 601. The radio network controller 15 decides that the second radio base station 14 is to control UL CLTD for the user equipment 10.

Action 602. The radio network controller 15 sets up a new radio link with a UL CLTD configuration. E.g. the radio network controller 15 sets up a new radio link with a UL CLTD configuration using e.g. NBAP protocol to the second radio base station 14.

Action 603. The radio network controller 15 transmits, to the first radio base station 12', an indication indicating removal of UL CLTD control for the user equipment 10.

The radio network controller 15 may be a serving radio network controller 15' of the first radio base station 12'. The indication may be sent via the Drifting Radio network controller 16 controlling the second and/or the first radio base station 12',14. The radio network node 15 may transmit the indication during Radio Interface Parameter Update procedure. The radio network controller 15 may transmit the indication over a Dedicated Channel to the first radio base station 12'. In some embodiments the indication comprises only one bit. The indication may be comprised in a Downlink Data frame of a User Plane Dedicated Channel, UP DCH, frame protocol. The indication may be comprised in a spare bit of an octet of bits in a User Plane frame protocol. The indication may further be comprised in a Radio Network Subsystem Application Part, RNSAP, message or a NodeB Application Part, NBAP, message. The indication may indicate that the first radio base station 12' is no longer an UL CLTD control node.

Figure 7:
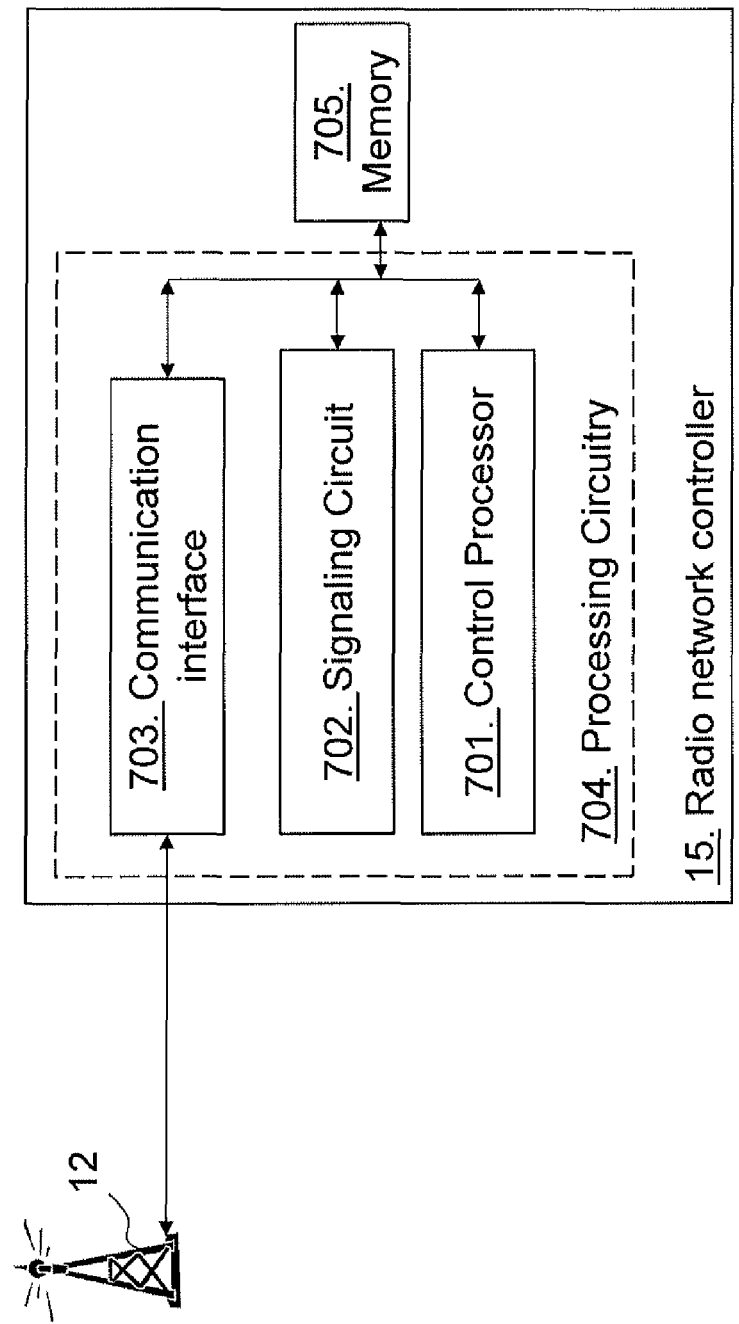
FIG. 7 is a block diagram depicting a radio network controller according to embodiments herein.

FIG. 7 is a block diagram depicting the radio network controller according to embodiments herein for managing UL CLTD. The radio network controller 15 controls the first radio base station 12' or the second radio base station 14. The first radio base station 12' is configured to control UL CLTD of the user equipment 10 served by the first radio base station 12'.

The radio network controller 15 comprises a control processor 701 configured to decide that the second radio base station 14 is to control UL CLTD for the user equipment 10. The control processor 701 may further be configured to set up a new radio link with a UL CLTD configuration.

The radio network controller further comprises a signalling circuit 702 configured to transmit, e.g. via a communication interface 703, to the first radio base station 12', an indication indicating removal of UL CLTD control for the user equipment 10. The signalling circuit 702 may be configured to send the indication via a Drifting Radio network controller controlling the second and/or the first radio base station 12',14.

The signalling circuit 702 may be configured to transmit the indication during Radio Interface Parameter Update procedure. The signalling circuit 702 may be configured to transmit the indication over a Dedicated Channel. The indication may comprise only one bit. The indication may be comprised in a Downlink Data frame of a User Plane Dedicated Channel, UP DCH, frame protocol. The indication may be comprised in a spare bit of an octet of bits in a User Plane frame protocol. The indication may be comprised in a Radio Network Subsystem Application Part, RNSAP, message or a NodeB Application Part, NBAP, message. The indication may indicate that the first radio base station 12' is no longer an UL CLTD control node.

In some embodiments the radio network controller 15 is a serving radio network controller of the first radio base station 12'.

FIG. 5 and FIG. 7 illustrate non-limiting example embodiments of the RNC 15 and the radio base station 12 configured according to some embodiments herein. However, those skilled in the art will appreciate that the digital processing resources provided in RNCs and radio base stations allow significant variation in the implementation of physical and functional circuitry and that the illustrated architecture thus represents a non-limiting implementation of the present invention. In that regard, the depicted RNC 15 comprises control and processing circuits, representing the signalling, control, and communications circuitry of the RNC 15. These circuits may comprise a mix of fixed and programmed circuit resources, including any number of microprocessor-based circuits that execute program instructions from computer programs that are stored in memory or other computer-readable media in or accessible to the RNC 15.

In turn, the radio base station 12 comprises, as will be understood by those of ordinary skill in the art, control and processing resources—e.g., one or more fixed and/or programmed processing circuits. As depicted in the example, the radio base station 12 comprises a control processor that is configured to interpret and respond to the aforementioned removal signalling, which is received through the radio base station 12 communication interface(s), including a signalling interface that communicatively couples the radio base station 12 directly or indirectly to the RNC 15. In turn, the radio base station's signalling circuit(s) extract and process the received signalling, and provide the control processor with extracted/processed signalling messages. In this regard, it should be noted that the RNC's control processor and/or the radio base station's control processor may be integrated in or cooperate with the signalling circuitry respectively comprised in each such node.

In the particular example of FIG. 7, the RNC's control processor 701 and processing circuits comprise the control processor 701 that determines when to send the contemplated UL CLTD removal indicator to the radio base station 12, to cause that radio base station 12 to stop UL CLTD control operations with respect to the user equipment. That is, in a particular example, the user equipment 10 has undergone SHO to a new cell controlled by the second radio base station 14 and the RNC 15, acting as the Serving RNC or SRNC, decides that the new cell under the second radio base station 14 should be the UL CLTD control cell. The RNC's control processor 701, for example, is configured to make that decision and to cooperate with the signalling circuitry and communication interface(s) to communicate that decision to the radio base station 12.

With the above in mind, in one embodiment, the radio network controller 15 comprises:

the communication interface 703 communicatively coupling it to a radio base station 12,12',14 that is configured for UL CLTD control with respect to a given user equipment 10; and the control processor 701 configured to decide that, in the context of the user equipment 10 undergoing SHO to a new cell controlled by a new second radio base station 14, the new cell should be the control cell for UL CLTD, for the user equipment 10, and to correspondingly send, e.g., via comprised signalling circuitry 702 and the communication interface 703 a removal indication to the radio base station 12, indicating to the radio base station 12 that it should cease its UL CLTD control for the user equipment 10.

The above operation is triggered, for example, responsive to the user equipment 10 detecting the new cell belonging to the second radio base station 14, and reporting such detection to the network.

From the e.g. first radio base station 12' perspective, the teachings herein also provide a radio base station 12 that comprises: the control processor 502 or another control element within the radio base station's comprised control and processing circuits that is configured to provide UL CLTD control for the user equipment 10, and wherein the control processor 502 is further configured to cease UL CLTD control for the user equipment 10 responsive to receiving removal signalling; and one or more communication interfaces 501 and associated signalling circuitry 503 configured to receive the removal signalling and to provide the control processor 502 with such signalling.

The embodiments herein for handling or managing UL CLTD may be implemented through one or more processors, such as in a processing circuitry 504 in the radio base station 12 or a processing circuitry 704 in the radio network controller 15 depicted in FIGS. 5 and 7, together with computer program code for performing the functions and/or method actions of the embodiments herein. The program code mentioned above may also be provided as a computer program product, for instance in the form of a data carrier carrying computer program code for performing embodiments herein when being loaded into the radio base station 12 or the radio network controller 15. One such carrier may be in the form of a CD ROM disc. It is however feasible with other data carriers such as a memory stick. The computer program code may furthermore be provided as pure program code on a server and downloaded to the radio base station 12 or the radio network controller 15.

Those skilled in the art will also appreciate that the various "circuits" described may refer to a combination of analogue and digital circuits, and/or one or more processors configured with software and/or firmware, e.g. stored in memory, that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The radio base station 12 and the radio network controller 15 may further comprise a memory 505 in the radio base station 12 and a memory 705 the radio network controller 15 to store data on. The data may comprise UL CLTD parameter data, Cell IDs, applications to perform method disclosed herein and similar.

In the drawings and specification, there have been disclosed exemplary embodiments herein. However, many variations and modifications can be made to these embodiments without substantially departing from the principles of the embodiments. Accordingly, although specific terms are employed, they are used in a generic and descriptive sense only and not for purposes of limitation, the scope of the invention being defined by the following claims.

ABBREVIATIONS

For ease of reference and understanding, the following listing presents definitions for the various abbreviations and acronyms used in this disclosure:
UL CLTD Uplink Closed Loop Transmit Diversity
HSPA High Speed Packet Access
TSG RAN 3GPP specification group for Radio Access networks
RL Radio Link
NBAP NodeB Application Part
RNSAP Radio Network Subsystem Application Part
RRC Radio Resource Control
UP User Plane
CP Control Plane
SHO Soft Hand Over
UE User Equipment
HSDPA High Speed Downlink Packet Access
L1 Layer 1, the physical layer
Iub The interface between the RNC and the NodeB
Iur The interface between RNCs in the same network
TFI Transport Format Indicator
DCH Dedicated Transport Channel
DPCH Dedicated Physical Channel
HS-DSCH High Speed Downlink Shared Channel
RNC Radio Network Controller
SRNC Serving Radio Network Controller
DRNC Drifting Radio Network Controller

The invention claimed is:

1. A method in a radio base station for handling Uplink Closed Loop Transmit Diversity (UL CLTD), wherein the radio base station is configured to control the UL CLTD of a user equipment served by the radio base station, the method comprising:
receiving, from a radio network controller, an indication indicating removal of the UL CLTD; and
removing the UL CLTD related operation for the user equipment from the radio base station based on the received indication.

2. The method of claim 1, wherein receiving the indication comprises receiving the indication over a Dedicated Channel.

3. The method of claim 1, wherein the indication comprises only one bit.

4. The method of claim 1, wherein the indication is comprised in a Downlink Data frame of a User Plane Dedicated Channel (UP DCH) frame protocol.

5. The method of claim 1, wherein the indication is comprised in a spare bit of an octet of bits in a User Plane frame protocol.

6. The method of claim 1, wherein the indication is comprised in a Radio Network Subsystem Application Part (RNSAP) message or a NodeB Application Part (NBAP) message.

7. The method of claim 1, wherein the indication indicates that the radio base station is no longer a UL CLTD control node.

8. The method of claim 1, wherein the indication is comprised in a Radio Interface Parameter Update message.

9. A method in a radio network controller for managing Uplink Closed Loop Transmit Diversity (UL CLTD), wherein the radio network controller controls a first radio base station or a second radio base station, wherein the first radio base station is configured to control the UL CLTD of a user equipment served by the first radio base station, the method comprising:
deciding that the second radio base station is to control the UL CLTD for the user equipment; and
transmitting, to the first radio base station, an indication indicating removal of the UL CLTD control for the user equipment from the first radio base station.

10. The method of claim 9, wherein the radio network controller comprises a serving radio network controller of the first radio base station.

11. The method of claim 10, wherein transmitting the indication comprises transmitting the indication via a Drifting Radio network controller controlling at least one of the second and the first radio base station.

12. The method of claim 9, further comprising setting up a new radio link with a UL CLTD configuration.

13. The method of claim 9, wherein transmitting the indication comprises transmitting the indication during a Radio Interface Parameter Update procedure.

14. The method of claim 9, wherein transmitting the indication comprises transmitting the indication over a Dedicated Channel.

15. The method of claim 9, wherein the indication comprises only one bit.

16. The method of claim 9, wherein the indication is comprised in a Downlink Data frame of a User Plane Dedicated Channel (UP DCH) frame protocol.

17. The method of claim 9, wherein the indication is comprised in a spare bit of an octet of bits in a User Plane frame protocol.

18. The method of claim 9, wherein the indication is comprised in a Radio Network Subsystem Application Part (RNSAP) message or a NodeB Application Part (NBAP) message.

19. The method of claim 9, wherein the indication indicates that the first radio base station is no longer a UL CLTD control node.

20. A radio base station for handling Uplink Closed Loop Transmit Diversity (UL CLTD), wherein the radio base station is configured to control the UL CLTD of a user equipment served by the radio base station, wherein the radio base station comprises:
a communication interface configured to receive, from a radio network controller, an indication indicating removal of the UL CLTD; and
a control processor configured to remove the UL CLTD related operation for the user equipment from the radio base station based on the received indication.

21. The radio base station of claim 20, wherein the communication interface is configured to receive the indication over a Dedicated Channel.

22. The radio base station of claim 20, wherein the indication comprises only one bit.

23. The radio base station of claim 20, wherein the indication is comprised in a Downlink Data frame of a User Plane Dedicated Channel (UP DCH) frame protocol.

24. The radio base station of claim 20, wherein the indication is comprised in a spare bit of an octet of bits in a User Plane frame protocol.

25. The radio base station of claim 20, wherein the indication is comprised in a Radio Network Subsystem Application Part (RNSAP) message or a NodeB Application Part (NBAP) message.

26. The radio base station of claim 20, wherein the indication indicates that the radio base station is no longer a UL CLTD control node.

27. The radio base station of claim 20, wherein the indication is comprised in a Radio Interface Parameter Update message.

28. A radio network controller for managing Uplink Closed Loop Transmit Diversity (UL CLTD), wherein the radio network controller controls a first radio base station or a second radio base station, wherein the first radio base station is configured to control the UL CLTD of a user equipment served by the first radio base station, wherein the radio network controller comprises:
 a control processor configured to decide that the second radio base station is to control the UL CLTD for the user equipment; and
 a signaling circuit configured to transmit, to the first radio base station, an indication indicating removal of the UL CLTD control for the user equipment from the first radio base station.

29. The radio network controller of claim 28, wherein the radio network controller comprises a serving radio network controller of the first radio base station.

30. The radio network controller of claim 29, wherein the signaling circuit is configured to transmit the indication via a Drifting Radio network controller controlling at least one of the second and the first radio base station.

31. The radio network controller of claim 28, wherein the control processor is further configured to set up a new radio link with a UL CLTD configuration.

32. The radio network controller of claim 28, wherein the signaling circuit is configured to transmit the indication during a Radio Interface Parameter Update procedure.

33. The radio network controller of claim 28, wherein the signaling circuit is configured to transmit the indication over a Dedicated Channel.

34. The radio network controller of claim 28, wherein the indication comprises only one bit.

35. The radio network controller of claim 28, wherein the indication is comprised in a Downlink Data frame of a User Plane Dedicated Channel (UP DCH) frame protocol.

36. The radio network controller of claim 28, wherein the indication is comprised in a spare bit of an octet of bits in a User Plane frame protocol.

37. The radio network controller of claim 28, wherein the indication is comprised in a Radio Network Subsystem Application Part (RNSAP) message or a NodeB Application Part (NBAP) message.

38. The radio network controller of claim 28, wherein the indication indicates that the first radio base station is no longer a UL CLTD control node.

* * * * *